United States Patent [19]
Ezuriko

[11] Patent Number: 5,444,738
[45] Date of Patent: Aug. 22, 1995

[54] SIGNAL PROCESSING CIRCUIT FOR SELECTIVE WAVEFORM EQUALIZATION WITHOUT SIGNAL COLLISION AND OMISSION

[75] Inventor: Hiroshi Ezuriko, Tokyo, Japan

[73] Assignee: NEC Corporation, Tokyo, Japan

[21] Appl. No.: 229,343

[22] Filed: Apr. 18, 1994

[30] Foreign Application Priority Data

Apr. 16, 1993 [JP] Japan .................................. 5-113923

[51] Int. Cl.⁶ .............................................. H03H 7/30
[52] U.S. Cl. .................................. 375/229; 364/724.2
[58] Field of Search ..................................... 375/11–14, 375/94, 99, 102, 104; 455/63, 67.6; 364/724.19, 724.20

[56] References Cited

U.S. PATENT DOCUMENTS

| | | | |
|---|---|---|---|
| 5,212,803 | 5/1993 | Uddenfeldt et al. | 375/102 |
| 5,214,391 | 5/1993 | Serizawa et al. | 329/316 |
| 5,230,077 | 7/1993 | Raith | 455/65 |

FOREIGN PATENT DOCUMENTS

0415897 3/1991 European Pat. Off. .

*Primary Examiner*—Stephen Chin
*Assistant Examiner*—Huong Luu
*Attorney, Agent, or Firm*—Sughrue, Mion, Zinn, Macpeak & Seas

[57] ABSTRACT

A radio telephone of a configuration permitting the selective use of a waveform equalizer is so configured that the output signals of a waveform equalizer or the output signals of a receiving circuit are selectively stored in one memory or sequentially stored in plural memories, respectively, a plurality of memories, and stored signals can be selectively taken out of the one memory when the waveform equalizer is used, and stored signals can be sequentially taken out Of plural memories at respectively proper timings, to thereby to prevent omission and collision of signal at the time of switching between use and non-use of the waveform equalizer.

11 Claims, 6 Drawing Sheets

SIGNAL PROCESSING CIRCUIT FOR SELECTIVE WAVEFORM EQUALIZATION WITHOUT SIGNAL COLLISION AND OMISSION

BACKGROUND OF THE INVENTION

1. Field of the Invention

The present invention relates to signal processing circuits as may be used in a radio receiver and more particularly, to such circuits as may be used in a mobile radio telephone capable to prevent collision and omission of received signals when a waveform equalizer is to be selectively used for radio signals from a base station.

2. Description of the Related Art

A time division multiple access system is used in a digital mobile radio telephone system which consists of a plurality of stationary base stations and a plurality of independent mobile stations. Some mobile stations have waveform equalizers in their receiving circuits so as to remove multi-pass fading or compensate for data omission due to noise or the like for radio signals from the base stations. However, since the use of this waveform equalizer results in increased consumption of electric power, refrainment from its use as far as possible is preferred for the mobile stations which derive power supply from batteries or the like. For this reason, a mobile station which switches between the use and non-use of the waveform equalizer is described in, for example, U.S. Pat. No. 5,230,077.

In this mobile station, the omission or collision of signals occurs when switching is done between use and non-use of the waveform equalizer. The reason is that a waveform equalized signal to a decoder is delayed by the time taken to effect the equalization processing, compared with a waveform non-equalized signal. For example, when a signal supplied to the decoder is switched from the equalized signal to the non-equalized signal, the equalized signal overlaps the non-equalized signal because the equalized signal is delayed and the non-equalized signal is not delayed. Therefore, the decoder runs into collision and thereby invites the loss of data. On the other handy when the signal supplied to the decoder is switched from the non-equalized signal to the equalized signal, the input of the decoder is interrupted since the start of use of the waveform equalizer invites an initial delay of received signal.

SUMMARY OF THE INVENTION

It is therefore an object of the present invention to provide a radio receiver capable of preventing the collision and omission of signals when switching between use and non-use of the waveform equalizer takes place.

According to the present invention, the inventive radio receiver is structured so as to permit selective use of a waveform equalizer and includes a plurality of memories capable of storing the output signals of a receiving circuit or the output signals of a waveform equalizer, a data storage switch for selectively supplying the output signals of the waveform equalizer and the receiving circuit to selected ones of the memories, a data output switch for selecting the data to be inputted from these memories to a convolutional code decoder, and a data saving controller for judging on the basis of a condition of the received signals whether or not it is necessary to use the waveform equalizer and performing switching control over each of the data storage switch and the data output switch in accordance with whether or not the waveform equalizer is used.

The data saving controller, when the waveform equalizer is used, achieves control so as to store the output signals of the waveform equalizer into only one memory, takes out the data from this memory and causes the data to be inputted to a convolutional code decoder. When the waveform equalizer is not used, the data saving controller achieves control so as to perform sequential storage of the output signals for the receiving circuit into a plurality of memories, and takes out data sequentially from these memories and causes the data to be inputted to the convolutional code decoder.

For instance, the radio receiver is provided with first and second memories, and is so structured that the data storage switch switches to select the output signals of the waveform equalizer to be stored in the first memory, and those of the receiving circuit to be stored in the first and the second memories, and the data output switch switches to select which stored signals are to be inputted to the convolutional code decoder from the first memory and second memory.

Further, the radio receiver may have a correction rate detector for detecting error data correction rate of the convolutional code decoder, wherein the data saving controller judges on the basis of the result of detection by this correction rate detector whether or not it is necessary to use the waveform equalizer.

BRIEF DESCRIPTION OF THE DRAWINGS

The above and other objects, features and advantages of this invention will become more apparent from the following detailed description taken with the accompanying drawings in which:

FIGS. 5(a) to 5(j) form a timing chart covering various parts of the telephone shown in FIG. 1 at the time of switching from non-use to use of the waveform equalizer shown in FIG. 1; and FIGS. 6(a) to 6(j) form a timing chart covering various parts of the telephone shown in FIG. 1 at the time of switching from non-use of the waveform equalizer shown in FIG. 1.

In the drawings, the same reference numerals denote the same structural elements.

DESCRIPTION OF THE PREFERRED EMBODIMENT

Now there will be described in detail preferred embodiments of the present invention with reference to FIGS. 1 to 6.

Figure 1:
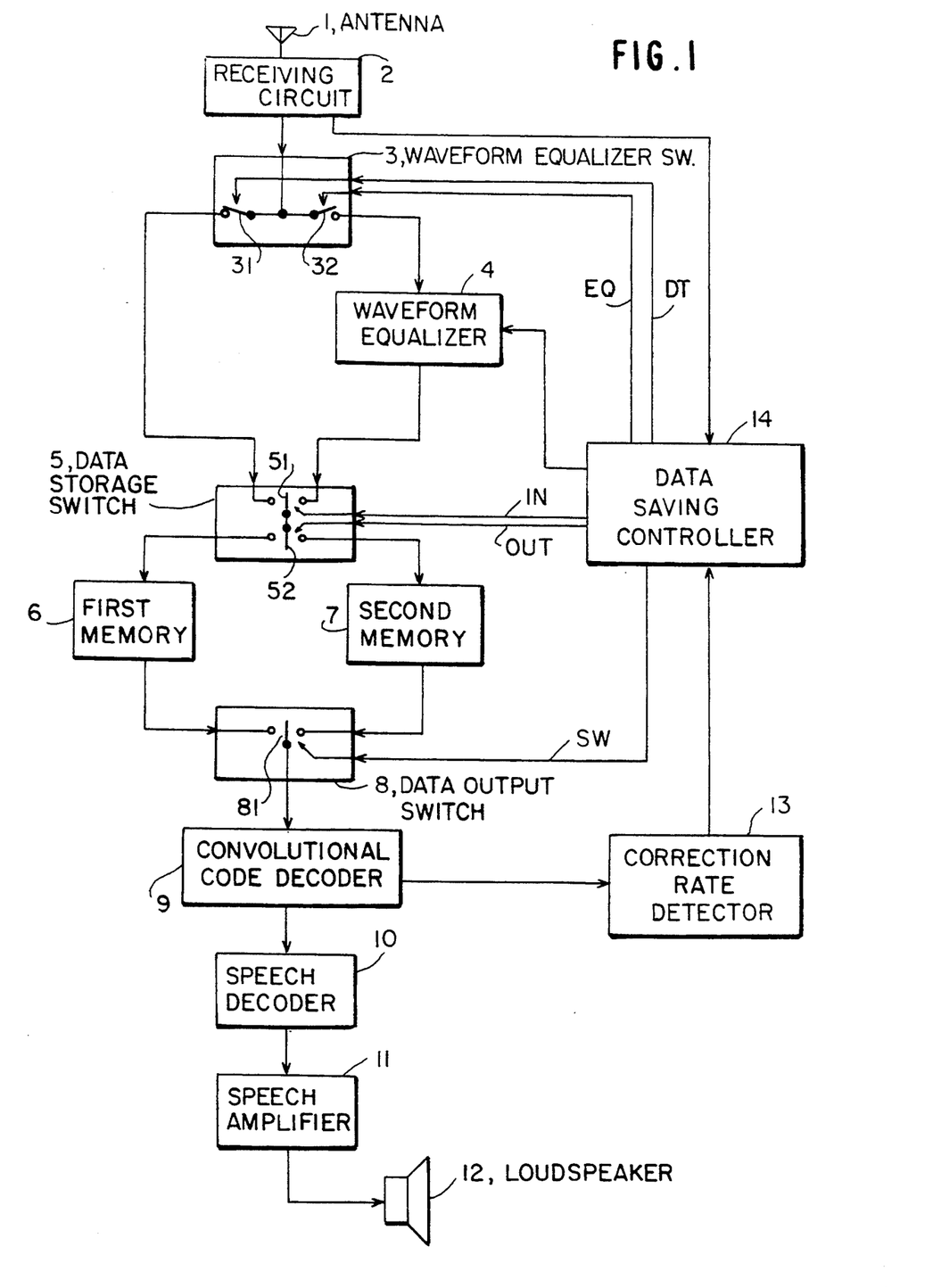
FIG. 1 is a block diagram of a preferred embodiment of the radio telephone of the present invention.

FIG. 1 is a block diagram of an embodiment of the present invention. In FIG. 1, a radio telephone according to a preferred embodiment of the present invention consists of an antenna 1, a receiving circuit 2, a waveform equalizer switch 3, a waveform equalizer 4, a data storage switch 5, a first memory 6, a second memory 7, a data output switch 8, a convolutional code decoder 9, a speech decoder 10, a speech amplifier 11, a loudspeaker 12, a correction rate detector 13 and a data saving controller 14. The waveform equalizer switch 3 consists of switches 31 and 32. The data storage switch 5 consists of switches 51 and 52. The data output switch 8 consists of a switch 81.

A radio frequency signal received by the antenna 1 is detected by the receiving circuit 2, and demodulated into digital signals. The waveform equalizer switch 3 supplies the digital signals to the data storage switch 5 directly or through the waveform equalizer 4 by switching the switches 31 and 32 according to a pair of first control signals EQ and DT from the data saving controller 14. The waveform equalizer 4 performs waveform equalization processing.

The data storage switch 5 supplies the digital signals to the first memory 6 or the second memory 7 by switching according to a pair of second control signals IN and OUT from the data saving control circuit 14. The data output switch 8 selects whether the signals from the first memory 6 or from the second memory 7 are to be outputted to the convolutional code decoder 9 by switching according to a third control signal SW from the data saving control circuit 14. The operation of switching in the switches 3, 5 and 8 and the using of memories 6 and 7 are described in detail herein after.

The convolutional code decoder 9 converts the inputted signals into a form that can be handled by the speech decoder 10. Here, the convolutional code decoder 9 also restores restorable data out of the erroneous data detected in the process of data form conversion. A speech decoder 10 converts the output signals of the convolutional code decoder 9 into an analog speech signal. In this case, as the output signals of the convolutional code decoder 9 have been subjected to data compression, the signals are expanded. The speech decoder 10 expands the compressed speech signals to their normal signal length. The speech amplifier 11 amplifies the analog speech signals and outputs speech through the loudspeaker 12.

The convolutional code decoder 9 is connected to a correction rate detector 13, which detects the correction rate of erroneous data in the convolutional code decoder 9. Thus the correction rate detector 13 constantly monitors the operation of the convolutional code decoder 9, counts the volume of erroneous data restored by the convolutional code decoder 9, calculates for every unit length of time how many erroneous data out of the total processed data have been restored, and sends the result to the data saving controller 14.

The data saving controller 14 judges according to the output of this correction rate detector 13 whether or not it is necessary to use the waveform equalizer 4 and controls the waveform equalizer switch 3, the data storage switch 5, and the data output switch 8. The data saving controller 14 controls the waveform equalizer switch 3 so as to supply the data from the receiving circuit 2 to the waveform equalizer 4 when the correction rate of erroneous data in the convolutional code decoder 9 has surpassed a predetermined value. Or, conversely, if the correction rate of erroneous data is below the predetermined value, the waveform equalizer 4 is not to be used. The data saving controller 14 controls the waveform equalizer switch 3 so as to supply the signals from the receiving circuit 2 to the data storage switch 5 directly.

Furthermore, correspondingly to this, the data saving controller 14 controls the data storage switch 5 to switch between the storage of the output of the receiving circuit 2 or the output of the waveform equalizer 4 into the first memory 6 and its storage into the second memory 7. After that, it switches the data output switch 8 to select the data of either the first memory 6 or the second memory 7, and causes the data to be inputted to the convolutional code decoder 9.

At this time, if the waveform equalizer 4 is used, control is so effected that the output signals of the waveform equalizer 4 is stored in the first memory 6 and these stored signals are then inputted to the convolutional code decoder 9. Or, if the waveform equalizer 4 is not used, control is so achieved that the output signals of the receiving circuit 2 is alternately stored in the first memory 6 and the second memory 7, and correspondingly to this, the data of the first memory 6 and the data of the second memory 7 are alternately inputted to the convolutional code decoder 9.

Figure 2:
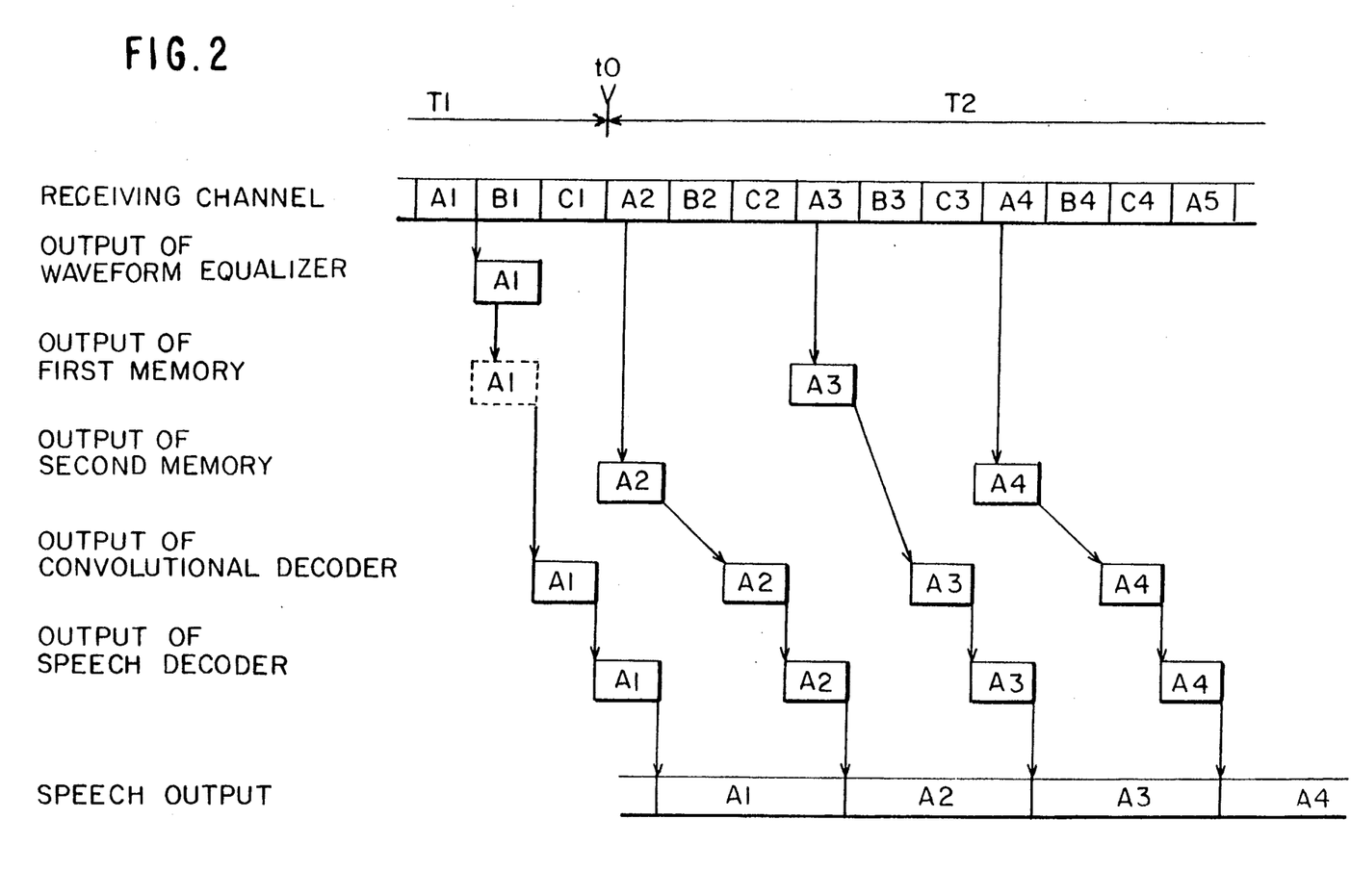
FIG. 2 is a timing chart showing the state in the telephone according to the present invention at the time of switching from a state in which the waveform equalizer shown in FIG. 1 is used to a state in which it is not used.
Figure 3:
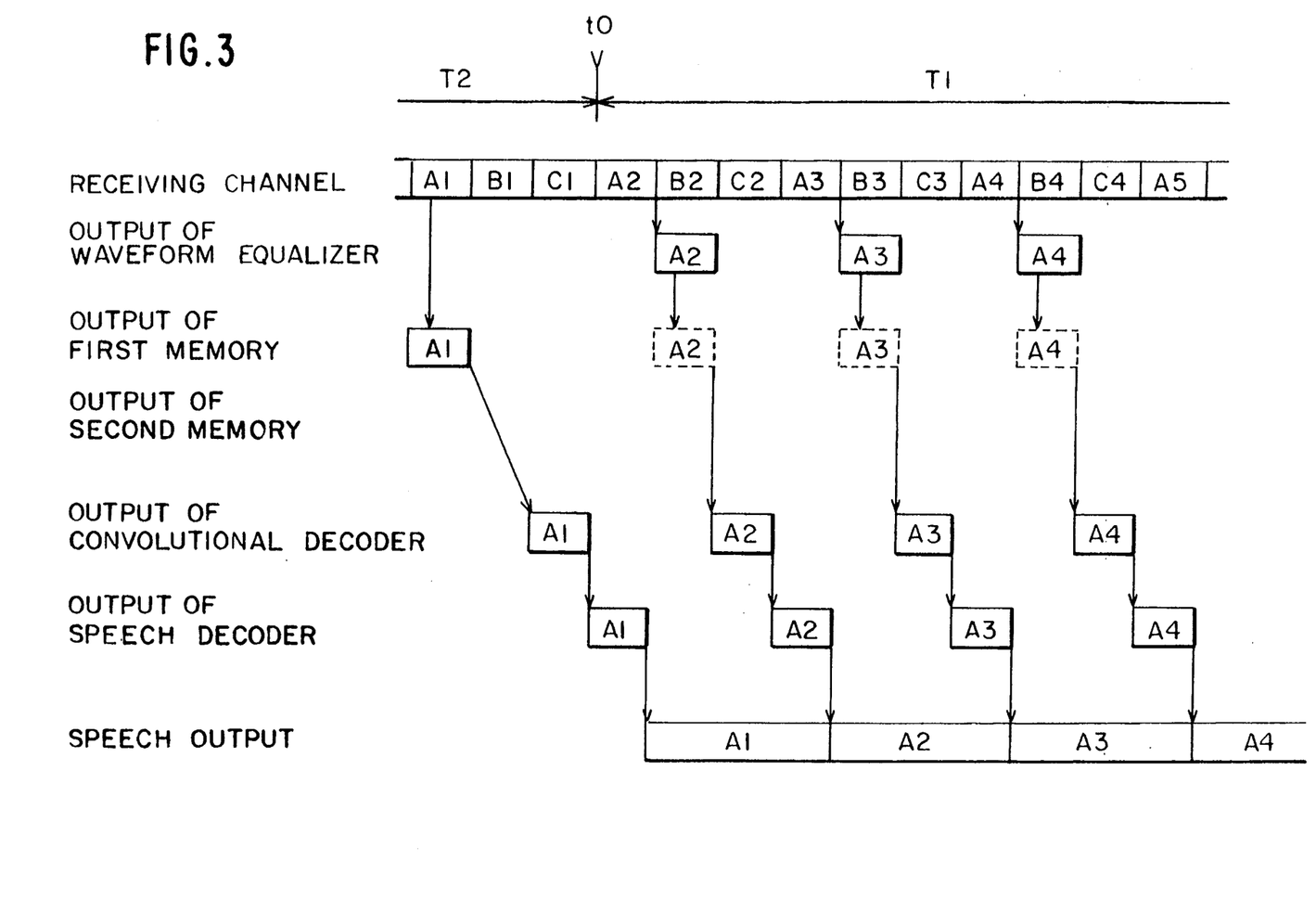
FIG. 3 is a timing chart showing the state in the telephone according to the present invention at the time of switching from a state in which the waveform equalizer shown in FIG. 1 is not used to a state in which it is used.

The operation of this radio telephone, especially the operation to take place when switching be between using the waveform equalizer 4 or not, will be described with reference to the timing charts of FIGS. 2 and 3. In FIGS. 2 and 3, the contents of transmission and reception over a radio channel are divided into frames and each frame is divided into time slots, for instance, three time slots.

FIG. 2 shows where switching has been done from a state in which the waveform equalizer 4 is used to a state in which it is not used, wherein period T1 is the duration of the use of the waveform equalizer 4, period T2, the duration of the non-use of the waveform equalizer 4, and t0, the time of switching. The data saving controller 14, in period T1, inputs the output signals A1 of the receiving circuit 2 to the waveform equalizer 4, stores the output signals of this waveform equalizer 4 in the first memory 6, and further delivers the data to the convolutional code decoder 9. Then, the data saving controller 14, when the waveform equalizer 4 goes out of use, starts alternately storing the output data A2, A3 and A4 of the receiving circuit 2 into the first memory 6 and the second memory 7, and further delivers the data from these circuits alternately to the convolutional code decoder 9. In this case, the signals during the period of the use of the waveform equalizer 4 are stored in the first memory 6, and when the use of the waveform equalizer 4 is stopped in this state, the next output signals from the receiving circuit 2 are stored in the second memory 7 without going through the waveform equalizer 4. And, after the signals of the first memory 6 are taken out and processed by the convolutional code decoder 9, the signals of the second memory are delivered to the convolutional code decoder 9. Therefore, even if the processing of the signals, for which the waveform equalizer 4 has been used, by the convolutional data decoder 9 is delayed, the next data will not collide with them, so that no output data from the receiving circuit 2 will be lost. For subsequent operations, too, collision of signals is avoided by having the signals of the first memory 6 and of the second memory alternately delivered to the convolutional decoder 9.

FIG. 3 shows where switching has been done from a state in which the waveform equalizer 4 is not used to a state in which it is used, wherein period T2 is the duration of the non-use of the waveform equalizer 4, period T1, the duration of the use of the waveform equalizer 4, and t0, the time of switching. The data saving controller 14, in period T2, alternately stores the output signals of the receiving circuit 2 in the first memory 6 and the second memory 7, further takes out the signals alternately from these memories, and delivers the signals to the convolutional code decoder 9. Then, the data saving Controller 14, in period T1 when the waveform equalizer 4 is used, stores the output signals of the waveform equalizer 4 in the first memory 6 and, waits for the completion of the processing of data from the second memory 7 by the convolutional code decoder 9, takes out the signals of the first memory 6, and delivers the signals to the convolutional code decoder 9. Signal omission is thereby prevented.

Next, there will be described in detail the operation of the present invention hereinafter with reference to FIGS. 1 and 4 to 6.

The data saving controller 14 decides whether or not it is necessary to use the waveform equalizer 4 by comparing the correction rate R from the convolutional code decoder 9 with predetermined values O, P and Q (O<Q<P). When the correction rate R becomes equal to or greater than the predetermined value P, the output of the waveform equalizer 4 is supplied to the first memory 6 through the data storage switch 5. When the correction rate R becomes smaller than the predetermined value O, the output of the receiving circuit 2 is supplied to the first memory 6 or the second memory 7 through the data storage switch 5.

It is necessary to suppose a multi-pass and train the equalizing operation before supplying the output of the waveform equalizer 4 to the first memory 6. Therefore, Q is set between the predetermined values O and P. When the correction rate R becomes equal to or greater than the predetermined value Q, the waveform equalizer 4 starts to equalize the output of the receiving circuit 2. However, the data storage switch 5 supplies the output of the receiving circuit 2 to the memories 6 or 7. After that, when the correction rate R becomes equal to or greater than the predetermined value P, the equalized signal from the waveform equalizer 4 is supplied to the first memory 6 through the data storage switch 5.

Figure 4:
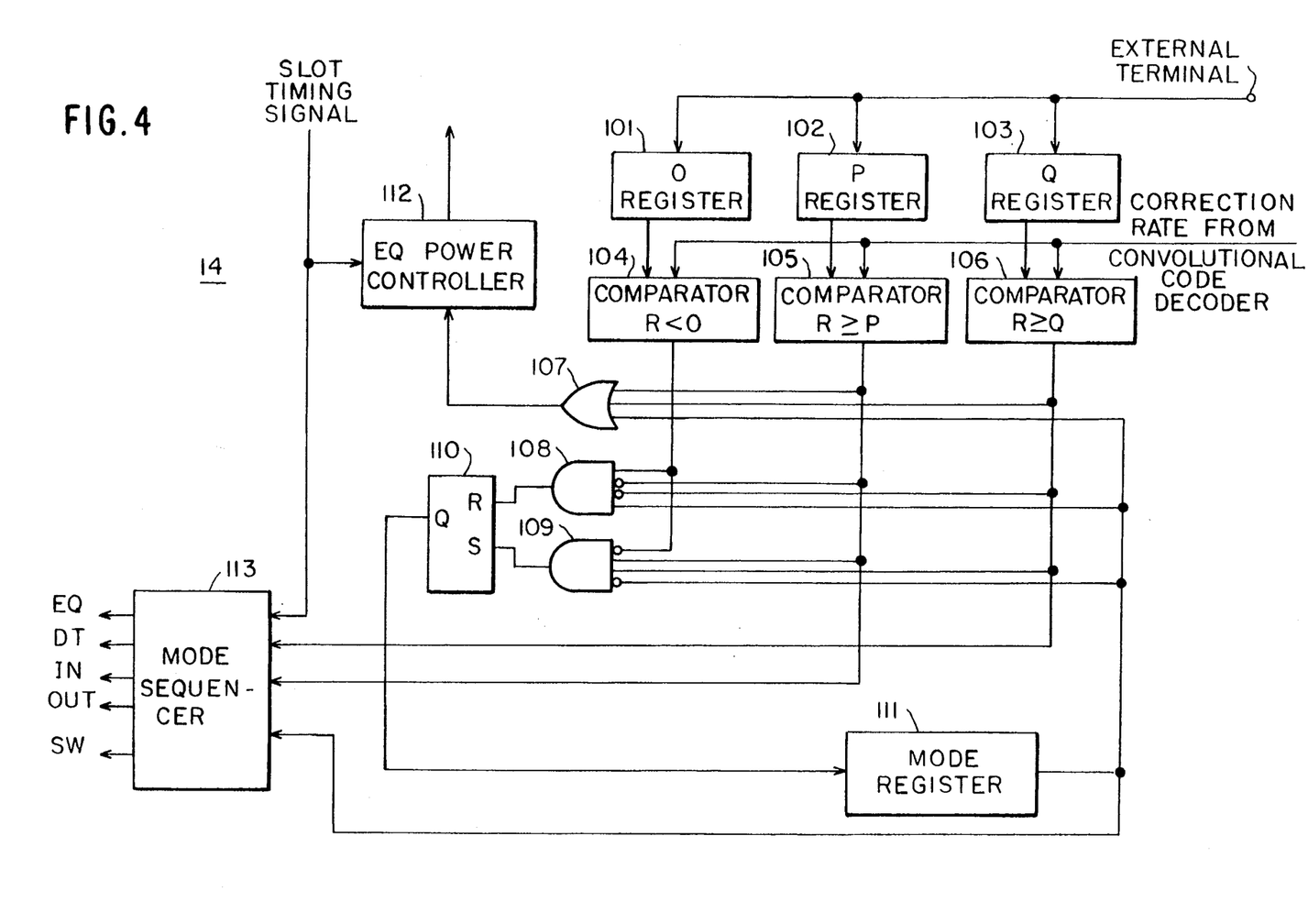
FIG. 4 is a block diagram of a preferred embodiment of the data saving controller shown in FIG. 1.

FIG. 4 shows a preferred embodiment of the data saving controller 14 shown in FIG. 1. In FIG. 4, the data saving controller 14 consists of registers 101,102 and 103, comparators 104, 105 and 106, an OR circuit 107, AND circuits 108 and 109, a set-reset circuit 110, a mode register 111, an equalizer (EQ) power controller 112 and a mode sequencer 113.

Predetermined values O, P and Q (O<Q<P) are stored in the registers 101, 102 and 103 from an external terminal, respectively. The comparator 104 compares the value 0 with the correction rate R from the convolutional code decoder 9 and outputs ON when the value O is greater than the correction rate R. The comparator 105 compares the value P with the correction rate R and outputs ON when the value P is equal to or smaller than the correction rate R. The comparator 106 compares the value Q with the correction rate R and outputs ON when the value Q is equal to or smaller than the correction rate R.

The mode register 111 registers the output of the set-reset circuit 110. When the output of the mode register 111 is, for example, low, the low signal shows EQ mode which the output of the waveform equalizer 4 is supplied to the memory 6. When the output of the mode register 111 is high, the high signal shows DT mode which the output of the receiving circuit 2 is supplied to the memories 6 or 7.

The power controller 112 supplies a power to the waveform equalizer 4 synchronized with a slot timing signal from the receiving circuit 2 when the correction rate R is equal to or greater than Q or P, or when the output of the mode register is EQ mode. Namely, the power of the waveform equalizer 4 is supplied, beginning with the training of the waveform equalizer 4, when the correction rate R surpasses the value Q to when the correction rate R is smaller than the value 0, which courses a change to the DT mode..

The AND gate 109 inputs the outputs of the comparators 105 and 106 and the inverse of the outputs of the comparator 104 and the mode register 111, and supplies the output to the set-reset circuit 110 as a set signal. Namely, the AND gate 109 detects when the correction rate R surpasses the value P. Therefore, the DT mode changes to the EQ mode.

The AND gate 108 inputs the outputs of the comparator 104 and the mode register 111 and the inverse of the outputs of the comparators 105 and 106, and supplies the output to the set-reset circuit 110 as a reset signal. Namely, the AND gate 108 detects when the correction rate R is smaller than the value 0. Therefore, the EQ mode changes to the DT mode.

The mode sequencer 113 inputs the output of the mode register 111, the comparators 105 and 106, and supplies the EQ and DT signals to the waveform equalizer switch 3, the IN and OUT signals to the data storage switch 5, and the SW signal to the data output switch 8 synchronized with the slot timing signal.

FIGS. 5(a) to 5(j) show a sequence changing from the DT mode to the EQ mode.

First, assuming that the correction rate R is smaller than the value O. The switch 31 of the waveform equalizer switch 3 is closed by the DT signal from the data saving controller 14 and the switch 32 is opened by the EQ signal (FIGS. 5(d) and 5(e)). The switch 51 of the data storage switch 5 is connected with the waveform equalizer switch 3 by the IN signal from the data saving controller 14 and the received signal is supplied to the first and second memories 6 and 7, sequentially by the OUT signal (FIGS. 5(f) and 5(g)). The switch 81 of the data output switch 8 selects the outputs of the first and second memories 6 and 7 sequentially by the SW signal from the data saving controller 14 (FIG. 5(h)) .

When the correction rate R surpasses the value Q, the power to the waveform equalizer 4 is supplied and the switch 32 is closed by the EQ signal (FIGS. 5(c) and 5(d)). Therefore, since the received signal from the receiving circuit 2 is supplied to the waveform equalizer 4, the training of the equalizer 4 starts.

After that, when the correction rate R surpasses the value P, the AND gate 109 detects that the correction rate R surpasses the value P and sets the set-reset circuit 110. Therefore, the EQ mode starts (FIG. 5(b)), the switch 51 is connected to the waveform equalizer 4 by the IN signal and the switch 52 is connected to the first memory 6 by the OUT signal (FIGS. 5(f) and (g)). The switch 81 is connected to the first memory 6 when the data is read from the first memory 6 by the SW signal (FIG. 5(h)). The switch 31 is opened by the DT signal (FIG. 5(e)).

Figures 5A, 5J:
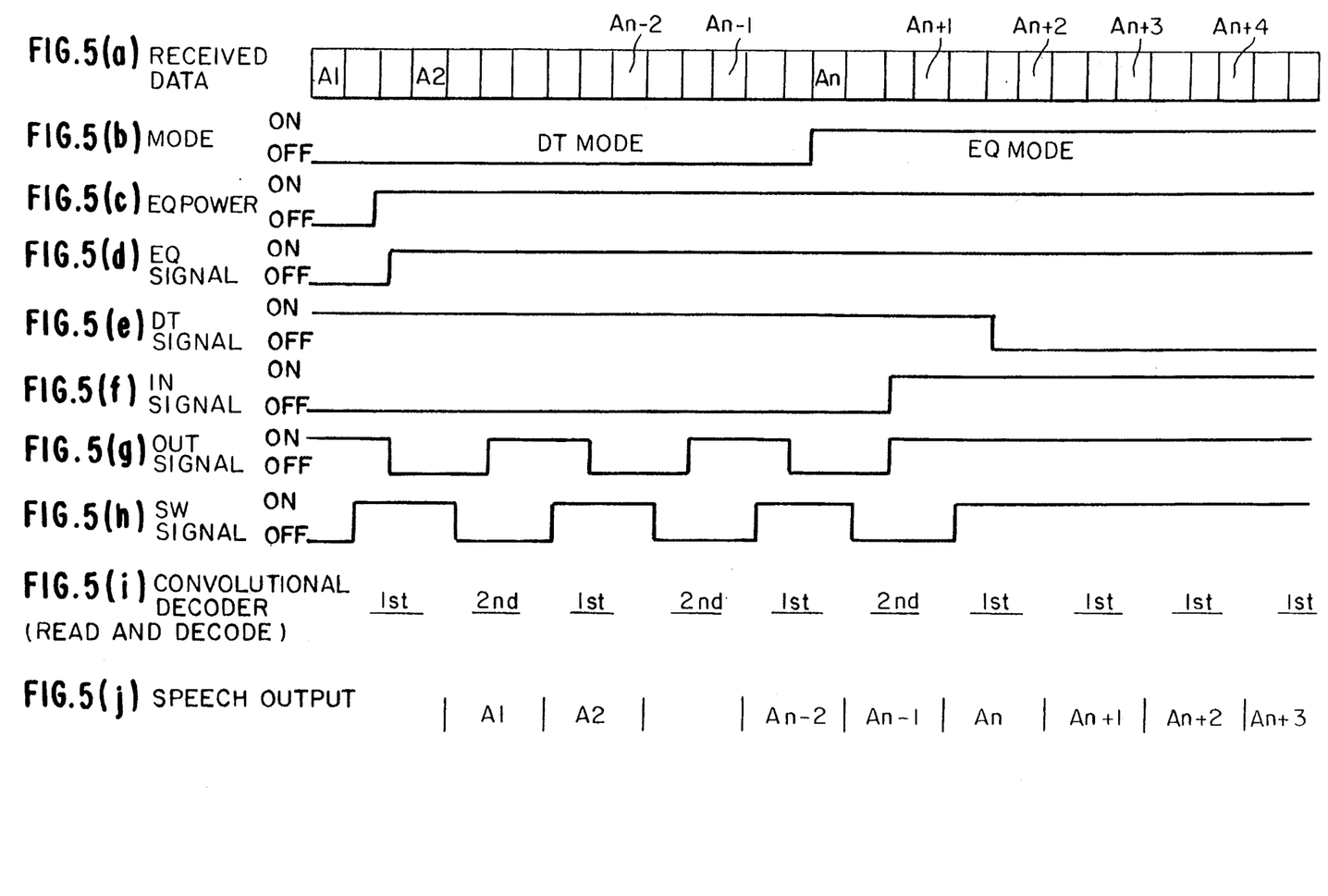

The convolutional decoder 9 reads and decodes the signals of the first and second memories 6 and 7 sequentially in the DT mode and the data of the first memory 6 in the EQ mode. A speech signal is as shown in FIG. 5(j).

FIGS. 6(a) to 6(j) show a sequence changing from the EQ mode to the DT mode.

When the correction rate R becomes smaller than the value Q in the EQ mode, the AND gate 114 shown in FIG. 4 detects that and the mode the switch 31 is closed by the DT signal (FIGS. 6(b) and (e)). After that, when the correction rate R is smaller than the value 0, the AND gate 108 shown in FIG. 4 detects that and the EQ mode changes to the DT mode (FIG. 6(b)). The switch 51 is connected to the switch 31 by the IN signal from the data saving controller and the switch 52 delivers the received data to the first and second memories 6 and 7 sequentially by the OUT signal (FIGS. 6(f) and (g)). The switch 81 is connected to the first and second memories 6 and 7 when the respective data is read from the memories 6 and 7 by the SW signal (FIG. 6(h)). The switch 32 is opened by the EQ signal and the power to the equalizer 4 is stopped (FIGS. 6(d) and (e)).

Figures 6A, 6J:
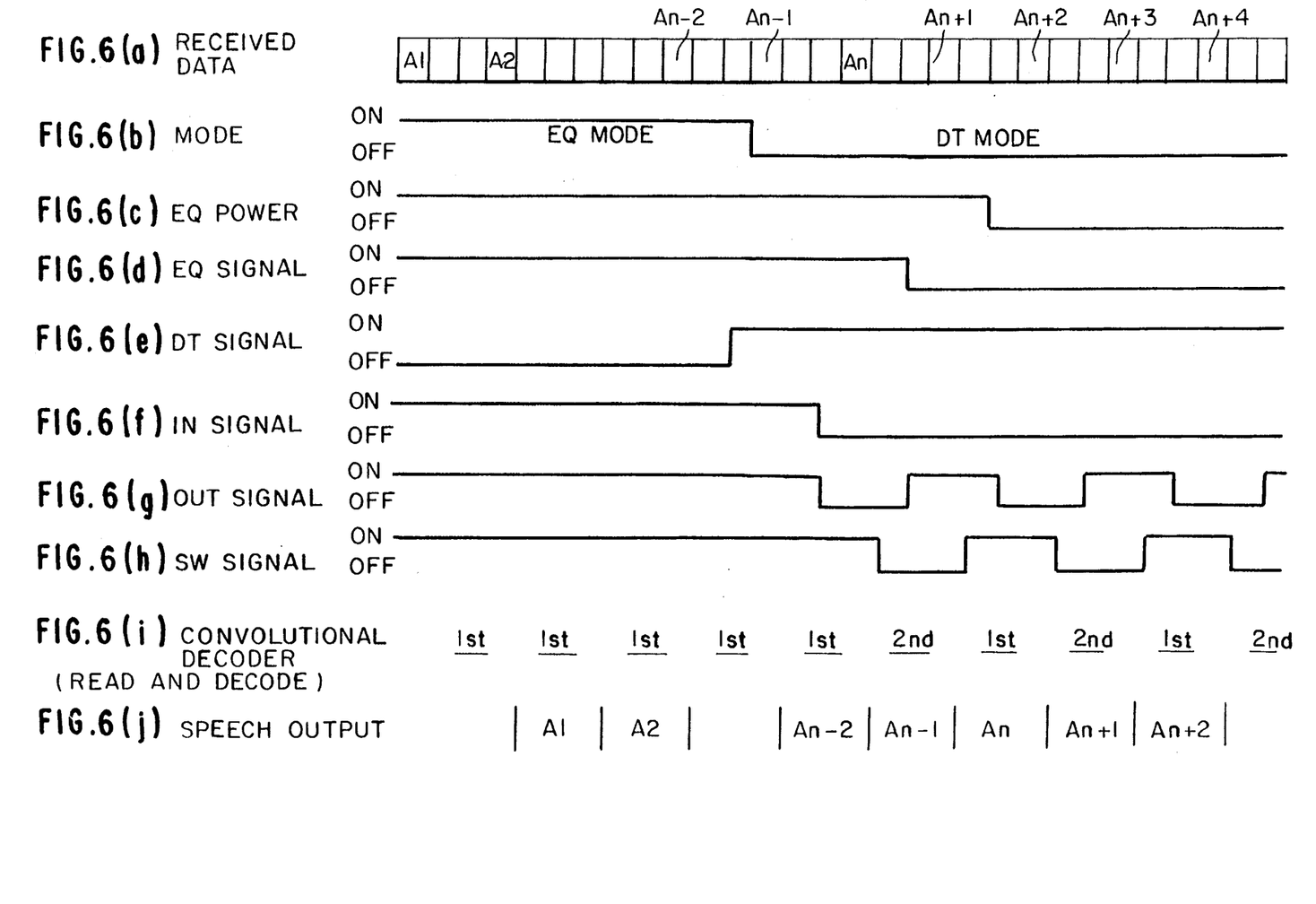

The convolutional decoder 9 reads and decodes the data of the first memory 6 in the EQ mode and the data of the first and second memories 6 and 7 sequentially in the DT mode. A speech output is shown in FIG. 6(j).

Although the embodiment has been described with respect to a case in which the modification was based on a specific factor, it goes without saying that the present invention is not restricted to this case. For example, the number of the time slots is not limited to three. Also, the data saving controller may be configured so as to control the use or non-use of the waveform equalizer, together with the accompanying switching of data storage and switching of data outputting, on the basis of other data, for example, a bit error rate rather than the rate of correction. Furthermore, a configuration in which three or more memories are provided in parallel and signals can be stored into and taken out of them sequentially by a data storage selector and a data output selector is also conceivable.

As hitherto described, the present invention makes it possible to keep constant the timing of signals inputting to a convolutional code decoder and prevent signal omission or collision even when switching is done between use and non-use of the waveform equalizer, since the radio telephone has a plurality of memories capable of storing the output signals of a receiving circuit or the output signals of a waveform equalizer to have the output signals selectively or sequentially stored in the memories and have signals selectively or sequentially taken out of them for inputting into a convolutional code decoder according to the use or non-use of the waveform equalizer.

Thus, when the waveform equalizer is used, control is so achieved that the output signals of the waveform equalizer can be stored in only one memory and data can be taken out of this memory to be inputted to the convolutional code decoder or, when the waveform equalizer is not used, control is so effected that the output signals from the receiving circuit can be sequentially stored in the plurality of memories and signals can be sequentially taken out of these memories to be inputted to the convolutional code decoder, and accordingly the timing of signal inputting to the convolutional code decoder can be kept constant by controlling the timings of signal storage into and extraction from the memories at the time of switching between use and non-use of the waveform equalizer.

For instance, by providing at least a first memory and a second memory, and controlling the choice between the first memory and the second memory for storage of the output signals from the receiving circuit and the waveform equalizer and the choice of the memory from which to take out data, realization of the present invention is made possible.

Furthermore, by providing a correction rate detector for detecting the correction rate of erroneous data by the convolutional code decoder and having a data saving controller judge whether or not it is necessary to use the waveform equalizer on the basis of the detection result of this correction rate detector, the waveform equalizer can be properly used according to the state of reception, and correspondingly reception avoiding the omission and collision of data is made possible.

What is claimed is:

1. A signal processing circuit for selectively equalizing signals comprising:
    a waveform equalizer for performing waveform equalization processing on nonequalized signals to produce equalized signals;
    a waveform equalizer switch for receiving nonequalized signals and for switching between a first output and a second output, said second output connected to an input of said waveform equalizer;
    a plurality of memories;
    a data storage switch for receiving nonequalized signals from said first output of said waveform equalizer switch and equalized signals from an output of said waveform equalizer, and selectively supplying said nonequalized and equalized signals to said plurality of memories;
    a data output switch for selecting data to be outputted from said plurality of memories; and
    a controller for controlling said waveform equalizer switch, said data storage switch and said data output switch.

2. The signal processing circuit as claimed in claim 1, wherein said controller controls said waveform equalizer switch, said data storage switch, and said data output switch on the basis of a condition of the nonequalized signals.

3. The signal processing circuit as claimed in claim 2, further comprising:
    a correction rate detector for detecting error data correction rate of the nonequalized signals, wherein said controller judges on the basis of the result of detection by said correction rate detector whether or not it is necessary to use said waveform equalizer.

4. The signal processing circuit as claimed in claim 3, wherein said controller comprises:
    at least one register for storing predetermined first, second and third values;
    at least one comparator for comparing the error data correction rate with the first, second and third values;
    a power supplier for supplying a power to said waveform equalizer, from a time at which the error data correction rate surpasses the second value to the time at which the error data correction rate is smaller than the first value; and
    a mode controller
    for supplying the nonequalized signals to said plurality of memories sequentially through said data storage switch when the error data correction rate is smaller than the first value,
    for starting to supply the nonequalized signals to said waveform equalizer when the error data correction rate surpasses the second value, for supplying the output of said waveform equalizer to one of said plurality of memories through said data storage switch when the error data correction rate surpasses the third value, and for supplying the nonequalized signals to said memories sequentially through said data storage switch and stopping the operation of the waveform equalization when the error data correction rate is smaller than the first value.

5. A radio receiver comprising:

receiving means for detecting and demodulating received signals;

a waveform equalizer for performing waveform equalization processing on output signals from said receiving means;

a waveform equalizer switch for switching between supplying and not supplying the output signals of said receiving means to said waveform equalizer;

a plurality of memories;

a data storage switch for selectively supplying the output signals of said receiving means and output signals of said waveform equalizer to selected memories of the plurality of memories;

a data output switch for selecting the data to be outputted from said selected memories; and a data saving control means for judging on the basis of the condition of the received signals whether it is necessary to use said waveform equalizer and controlling said waveform equalizer switch, said data storage switch and said data output switch accordingly.

6. The radio receiver as claimed in claim 5, wherein said data saving control means, when said waveform equalizer is used, controls so as to store the output signals of said waveform equalizer into only one memory and take out signals from said one memory, and when said waveform equalizer is not used, controls so as to perform sequential storage into said plurality of memories and take out signals sequentially from said plurality of memories.

7. The receiver as claimed in claim 5, wherein said data saving control means judges the condition of the received signals on the basis of error data correction rate.

8. The receiver as claimed in claim 5, wherein said plurality of memories comprises a first memory and a second memory.

9. The receiver as claimed in claim 8, wherein said data saving control means comprises:

register means for storing predetermined first, second and third values;

comparing means for comparing the error data correction rate with the first, second and third values;

power supplying means for supplying a power to said waveform equalizing means, from the time at which the error data correction rate surpasses the second value to the time at which the error data correction rate is smaller than the first value; and mode control means for supplying the received signals to said first and second memories sequentially through said data storage switch when the error data correction rate is smaller than the first value, for starting to supply the received signals to said waveform equalizing means when the error data correction rate surpasses the second value, for supplying the output of said waveform equalizing means to one of said first memory and said second memory through said data storage switch when the error data correction rate surpasses the third value, and for supplying the received signals to said first and second memories sequentially through said data storage switch and stopping the operation of the waveform equalization when the error data correction rate is smaller than the first value.

10. A method for controlling a radio receiver, the method comprising the steps of:

(a) receiving a signal;

(b) detecting a condition of said received signal;

(c) deciding whether it is necessary to perform a waveform equalization based on said condition;

(d) waveform equalizing said received signal when necessary according to said condition;

(e) storing waveform equalized signals in one memory when waveform equalization is performed and into plural memories when waveform equalization is not performed on said received signals; and (f) outputting the memorized signals.

11. The method for controlling the radio receiver as claimed in claim 10, the method further comprising the following steps of:

(g) supplying the received signals without equalization to plural memories sequentially when a correction rate as said receiving condition is smaller than a predetermined first value;

(h) starting to equalize the received signals when the correction rate surpasses a predetermined second value;

(i) supplying the equalized signals to one memory when the correction rate surpasses a predetermined third value; and (j) stopping the operation of the waveform equalization and supplying the received signals to the memories sequentially when the correction rate becomes smaller than the first value.

* * * * *

UNITED STATES PATENT AND TRADEMARK OFFICE
CERTIFICATE OF CORRECTION

PATENT NO.   : 5,444,738
DATED        : August 22, 1995
INVENTOR(S)  : Hiroshi EZURIKO It is certified that error(s) appears in the above-identified patent and that said Letters Patent is hereby corrected as shown below:

Abstract, line 9, delete "Of" and insert --of--.

Col. 1, line 43, delete "handy" and insert --hand,--.

Col. 4, line 22, delete "be".

Signed and Sealed this

Thirtieth Day of January, 1996

Attest:

BRUCE LEHMAN

Attesting Officer      Commissioner of Patents and Trademarks